US012577436B2

(12) United States Patent
McKillip et al.

(10) Patent No.: US 12,577,436 B2
(45) Date of Patent: Mar. 17, 2026

(54) EMBOSSING OR DEBOSSING OF A LABEL SUBSTRATE

(71) Applicant: Multi-Color Corporation, Batavia, OH (US)

(72) Inventors: Barron G. McKillip, Batavia, OH (US); A. Craig Bushman, Loveland, OH (US); Chris Alan Schumacher, Sonoma, CA (US)

(73) Assignee: Multi-Color Corporation, Batavia, OH (US)

( * ) Notice: Subject to any disclaimer, the term of this patent is extended or adjusted under 35 U.S.C. 154(b) by 0 days.

(21) Appl. No.: 18/104,366

(22) Filed: Feb. 1, 2023

(65) Prior Publication Data

US 2023/0174825 A1 Jun. 8, 2023

Related U.S. Application Data

(63) Continuation of application No. 16/788,581, filed on Feb. 12, 2020, now Pat. No. 11,667,814.

(Continued)

(51) Int. Cl.
*C09J 7/25* (2018.01)
*B29C 51/00* (2006.01)
(Continued)

(52) U.S. Cl.
CPC ................. *C09J 7/255* (2018.01); *C09J 7/29* (2018.01); *C09J 7/38* (2018.01); *C09J 7/403* (2018.01); *G09F 3/10* (2013.01); *B29C 51/002* (2013.01); *B29C 51/08* (2013.01); *B29K 2625/06* (2013.01); *B29L 2031/744* (2013.01);
(Continued)

(58) Field of Classification Search
CPC ..... C09J 7/255; C09J 7/29; C09J 7/403; C09J 7/38; C09J 2203/334; C09J 2425/006; G09F 3/10; G09F 2003/0248; G09F 2003/0255; G09F 2003/0263; G09F 2003/0264; G09F 2003/0273; Y10T 428/14; Y10T 428/1452; B29C 51/002;
(Continued)

(56) References Cited

U.S. PATENT DOCUMENTS 1,926,553 A 9/1933 Morse
3,402,495 A 9/1968 Fishback
(Continued)

FOREIGN PATENT DOCUMENTS

JP H0952296 A 2/1997
WO 0170897 A2 9/2001

OTHER PUBLICATIONS

International Search Report and Written Opinion in International Patent Application No. PCT/US2020/017869, mailed May 28, 2020, 15 pgs.
(Continued)

*Primary Examiner* — Patricia L. Nordmeyer
(74) *Attorney, Agent, or Firm* — Wood Herron & Evans LLP

(57) ABSTRACT

A label as shown and described herein. The label may include a label substrate, an adhesive adjacent the substrate, and a liner adjacent the adhesive, such that the adhesive is disposed between the label substrate and the liner, and wherein the label substrate is embossed or debossed, and the liner is not embossed or debossed.

10 Claims, 7 Drawing Sheets

Related U.S. Application Data

(60) Provisional application No. 62/804,333, filed on Feb. 12, 2019.

(51) Int. Cl.

| | |
|---|---|
| *B29C 51/08* | (2006.01) |
| *C09J 7/29* | (2018.01) |
| *C09J 7/38* | (2018.01) |
| *C09J 7/40* | (2018.01) |
| *G09F 3/02* | (2006.01) |
| *G09F 3/10* | (2006.01) |
| *B29K 625/00* | (2006.01) |
| *B29L 31/00* | (2006.01) |

(52) U.S. Cl.
CPC .... *C09J 2203/334* (2013.01); *C09J 2425/006* (2013.01); *G09F 2003/0248* (2013.01); *G09F 2003/0255* (2013.01); *G09F 2003/0263* (2013.01); *G09F 2003/0264* (2013.01); *G09F 2003/0273* (2013.01); *Y10T 428/14* (2015.01); *Y10T 428/1452* (2015.01)

(58) Field of Classification Search
CPC ................ B29C 51/08; B29K 2625/06; B29L 2031/744
See application file for complete search history.

(56) References Cited

U.S. PATENT DOCUMENTS

| | | | | |
|---|---|---|---|---|
| 5,219,655 | A * | 6/1993 | Calhoun ................. | H05K 3/20 |
| | | | | 428/209 |
| 7,592,057 | B2 | 9/2009 | Dronzek, Jr. et al. | |
| 10,201,949 | B1 * | 2/2019 | Buck .......................... | C09J 7/29 |
| 2003/0150148 | A1 | 8/2003 | Spear et al. | |
| 2013/0071589 | A1 | 3/2013 | Hannington et al. | |

OTHER PUBLICATIONS

Office Action in U.S. Appl. No. 16/788,581, dated Apr. 28, 2021, 11 pgs.
Office Action in U.S. Appl. No. 16/788,581, dated Dec. 1, 2021, 12 pgs.
Office Action in U.S. Appl. No. 16/788,581, dated Jul. 29, 2022, 9 pgs.

* cited by examiner

EMBOSSING OR DEBOSSING OF A LABEL SUBSTRATE

CROSS-REFERENCE TO RELATED APPLICATIONS

This application is a continuation of U.S. patent application Ser. No. 16/788,581 filed on Feb. 12, 2020, which claims the benefit of U.S. Patent Application No. 62/804,333 filed on Feb. 12, 2019, the disclosures of which are hereby incorporated by reference herein in their entireties.

FIELD OF THE INVENTION

The present invention relates to labels including raised or recessed relief images.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

As is well known in the art, embossing and debossing are procedures for creating either raised (embossed) or recessed (debossed) relief images and designs in paper and other materials. The procedure (e.g., embossing) often includes the use of two dies (e.g., a male die and a female die) that include raised portions, patterns, etc. The raised portions, patterns, etc. generally match one another, although one is smaller in dimensions than the other such that the dies can fit into one other. Thus, when paper, or other material, is placed between the dies and pressed between them, the contours of the raised portions of the dies forces the material between the two and creates the embossed impression. Factors that can be controlled during the embossing process to achieve different levels, quality, etc. of relief are: (1) pressure (e.g., the intensity of the impact on the weight of the material being embossed); (2) heat (e.g., the ability to maintain a consistent heat level for the best impression); and (3) die depth. Embossing can be used to attract attention or convey a high quality textural appearance. Debossing is similar to embossing, but recesses the design rather than raising it.

A general example of a two piece die set 10 including male and female dies 12, 14 is shown in FIG. 1 (with a cross-sectional view of the female die 14 being shown in FIG. 2). As described above, the male and female dies 12, 14 are positioned with a material therebetween. Heat can be supplied to either the male die 12, or the female die 14, or both.

The die set may include matched male and female roller dies, with the process including passing a sheet or a strip of material between rolls of the desired pattern. As the material is drawn through the male and female roller dies, a pattern or design on the material is produced. Depending on the roller dies used, different patterns can be produced on the sheet. A combination of pressure and heat may be used to raise the level of the image higher than the substrate. In most current embossing apparatus, the upper roll blocks are stationary, while the bottom roll blocks are movable. Alternatively, flat bed dies may be used (instead of roller dies).

One particular article that may undergo such procedures to be embossed or debossed are labels. Multiple types of labels can be embossed or debossed. One such type of label is a pressure sensitive label. The current method of embossing a pressure sensitive label is to use either a rotary or flat bed male and female set of dies. In such embodiments, the label stock is a pressure sensitive material which includes a face stock, pressure sensitive adhesive, and either a polyester or paper silicone release liner. The label stock including these layers is embossed by being rolled, pressed, or otherwise formed between male and female dies. Heat may also be applied during this process to thermoform the embossed label. Such procedures produce an embossed label 16, an example of which is shown in FIG. 3. As can be seen, the emboss 18 of this label 16 is received by, or formed in, each of the layers of the label (face stock 20, adhesive 22, and release liner 24). Accordingly, the multiple layers of the label increase the thickness of the materials being embossed and as such, reduces the height and definition of the emboss (see FIG. 3).

While having an embossed liner does not necessarily pose a problem for some labels, or in all situations, there are certain situations where an embossed liner results in some drawbacks. For example, an embossed liner is not necessarily a problem for labels that are either hand applied or applied at slow application speeds. However, an embossed liner is not ideal for high speed applications because the uneven surface to the liner disrupts the dispensing process. This can cause labels to be misapplied, fail to apply once dispensed, or fail to dispense from the apparatus (with the attendant need to remove and reapply misapplied labels, and any downtime that may result from labels that do not dispense from the apparatus).

Another drawback to current labels including embossing, involves the propensity for embossed labels to lift away from the article to which they are applied. Currently used label materials (such as materials used for pressure sensitive labels) have limited adhesive coverage in areas of the label that are embossed. This may occur, for example, due to adhesive only being present to contact an article and form a bond in those areas of the label where the label material is directly adjacent the article with adhesive therebetween. Thus, here the actual emboss (or raised material) is present, there may be no adhesive (or limited adhesive for contact with the article. Thus, if the label is embossed at or near the edges of the label, the smaller amount of adhesive (and thus lower strength of bond between label and article) may not be sufficient to retain the label on the article—thus resulting in edges of the label lifting away from the article. In current embossed labels, this drawback is addressed by ensuring that the embossed region of the label is kept away from the edges of the label.

Apart from the drawbacks discussed above with current procedures for embossing labels, there are also certain materials for labels (for which embossing may be desired) but which exhibit other drawbacks due to the environment in which they are used. For example, labels on bottles and containers of wine and spirits are often exposed to moisture and condensation at many steps in the chain of production and sale in the marketplace (and even post-sale). Traditionally, uncoated papers are used for wine and spirit labels as they provide a premium look. Unfortunately, however, most uncoated papers do not exhibit good moisture resistance and thus can "grey out," bubble, and/or wrinkle when exposed to moisture. The best performing material for ice bucket and moisture conditions is synthetic films, but customers traditionally do not like these films because the label does not have the desired premium look. One reason for this is because typical film materials cannot accept an emboss or deboss, because the material has no memory, and thus cannot retain the relief.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

As described above, current methods of creating relief images, text, graphics, etc. on labels are inadequate. Various aspects of the present invention overcome the drawbacks described above. The various aspects of the present invention also provide embossed (or debossed) labels that do not suffer the problems with dispensing of labels during a high-speed application process. Further, the various aspects of the present invention provide embossed labels that can be used in applications that may be exposed to moisture or condensation without suffering the current problems with aesthetics when exposed to moisture/condensation. And, various aspects of the present invention provide a label wherein the height of the relief can be controlled (e.g., heightened over that of prior art labels).

In that regard, one aspect of the present invention is provided by a label having a plurality of layers that includes at least (1) a label substrate, (2) an adhesive adjacent the substrate, and (3) a liner adjacent the adhesive, such that the adhesive is disposed between the label substrate and the liner. The label substrate is embossed or debossed, while the liner is not embossed or debossed. In certain embodiments, then, only the label substrate (i.e., the face stock of the label) is embossed. When embossing the label substrate (e.g., a face stock), heat may be applied along with the application of pressure to thermoform the emboss on the label substrate. Thermoforming of the emboss in or on the substrate can enhance the setting of the emboss in or on the substrate, thereby preventing it from relaxing back to its natural state (or reducing any relaxation). The substrate may be any label substrate, including paper, films, and foils. In one embodiment, once the label substrate is embossed, the embossed substrate may then be adhesive laminated to a liner (e.g., a pressure sensitive material in certain embodiments) and die cut, resulting in a label in which the liner includes no embossing/debossing. (In certain embodiments, the adhesion of substrate to liner may be via pattern adhesive lamination.) This eliminates certain dispensing issues described in the Background with respect to current embossed/debossed labels.

In an alternate embodiment of this aspect, a label may have a plurality of layers that includes at least (1) a label substrate, (2) a registered patterned adhesive adjacent the substrate, and (3) a liner adjacent the registered patterned adhesive, such that the registered patterned adhesive is disposed between the label substrate and the liner in such manner that it is disposed between a non-embossed section of the label substrate and the liner. In this aspect or embodiment, only the substrate of the label construction (i.e., the top ply) is embossed. Once the emboss is formed, an adhesive is then applied in register with the non-embossed section of the substrate. A liner may be then applied to the side of the adhesive layer opposite the substrate, forming the label. In this aspect or embodiment, the substrate could be any label substrate including paper, film, and foils. Further, in this aspect or embodiment, one may thermoform the emboss in or on the substrate.

Yet another aspect of the present invention is provided by a label having a plurality of layers that includes at least (1) a label substrate, (2) a laminating adhesive, and (3) a premanufactured label substrate. During preparation, the substrate (a top ply) is embossed, and then laminated to a pre-manufactured label substrate, resulting in a finished label construction with no embossing of the liner (the liner being provided by the pre-manufactured label substrate). The label substrate may be any label material, including paper, films, and foils. The premanufactured label substrate may be a pressure sensitive label substrate. Further, the premanufactured label substrate may comprise a label stock, a pressure sensitive adhesive, and a liner. The label stock of the premanufactured label substrate may be a thin label stock.

In the above aspects and embodiments, once the label construction is assembled, the labels may be die cut to result in a finished label or labels.

Another aspect of the present invention may include a label where the liner is embossed. This aspect may include embodiments such as those described above, but where the entire label construction is subjected to the embossing/thermoforming process. As an example, then, such a label may include at least (1) a label substrate, (2) an adhesive adjacent the substrate, and (3) a liner adjacent the adhesive, such that the adhesive is disposed between the label substrate and the liner. However, in this embodiment, the entire construction would be subjected to male and female dies to provide the emboss through all of the layers.

In such an embodiment, to avoid dispensing issues (such as those described above in the Background), the embossed image of the liner can be subsequently offset from the embossed image of the label substrate, once the embossing is complete. This may be accomplished with the use of a label shifter or a delamination/re-lamination process.

Another aspect of the present invention provides a label that may include at least (1) a label substrate, (2) an adhesive adjacent the substrate, and (3) a first liner adjacent the adhesive, such that the adhesive is disposed between the label substrate and the temporary liner. Once this construction is formed, the entire construction (substrate, adhesive, and first liner) may be subjected to male and female dies (as described previously) to provide an emboss through all of these layers. Following embossing, the first liner (which has the emboss) may then be removed and replaced with a second liner that has not be embossed. This second construction (substrate, adhesive, and second liner) is the construction that would be used for application to an article to be labeled.

Another aspect of the present invention provides labels that are capable of being embossed or debossed, and can be used in heightened moisture and condensation environments without suffering the drawbacks of uncoated papers (while still providing a premium look). In that regard, the present inventor has determined that films that include styrene is useful in such an environment. Materials including styrene accept embossing and debossing very well. With this ability, texture background grains can be embossed/debossed onto a label substrate that includes styrene along with sculptured multi-level embossing (e.g., for text, graphics, and other label information). As a result, such a material including styrene can visually come very close to a traditional uncoated paper look and feel, but have the ultra-wet strength and moisture resistance of a film material. Matte UV varnishes, texture grains, and sculpted embossing elements, may be combined to provide high end premium looks.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 3 can be considered to show a prior art version of a label.

DETAILED DESCRIPTION OF THE INVENTION

Figure 1:
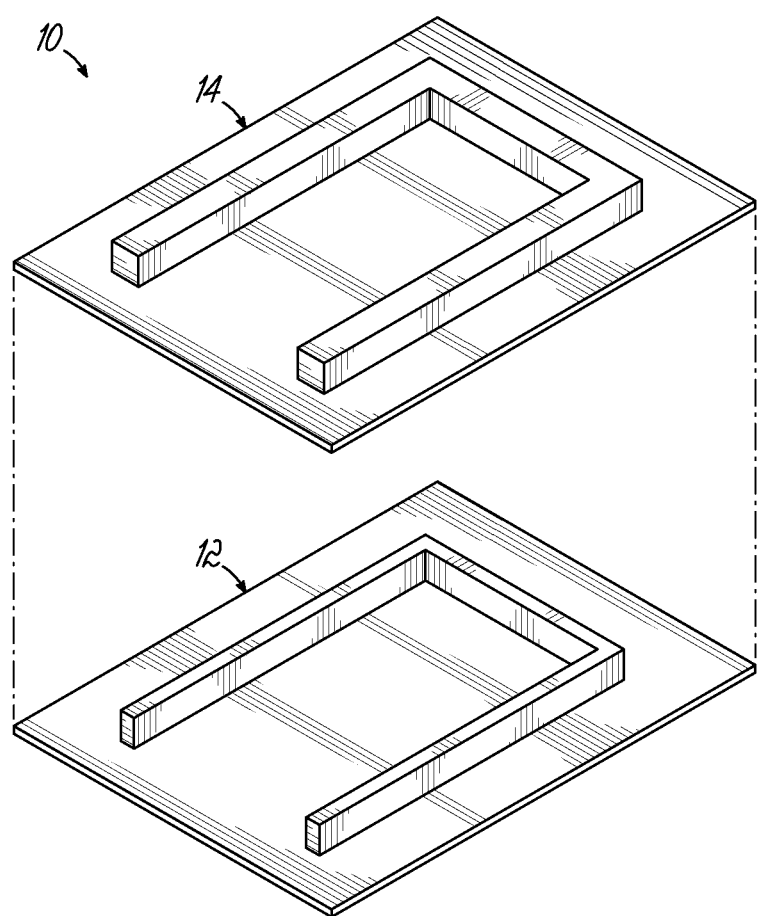
FIG. 1 is a schematic that shows male and female dies that can be used to emboss a material.
Figure 2:
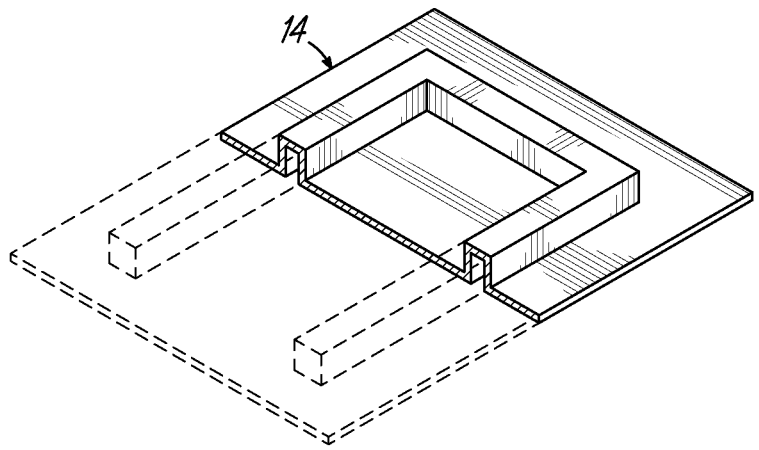
FIG. 2 is a schematic that shows a cut open and cross-sectional view of the female die.
Figures 3, 4:
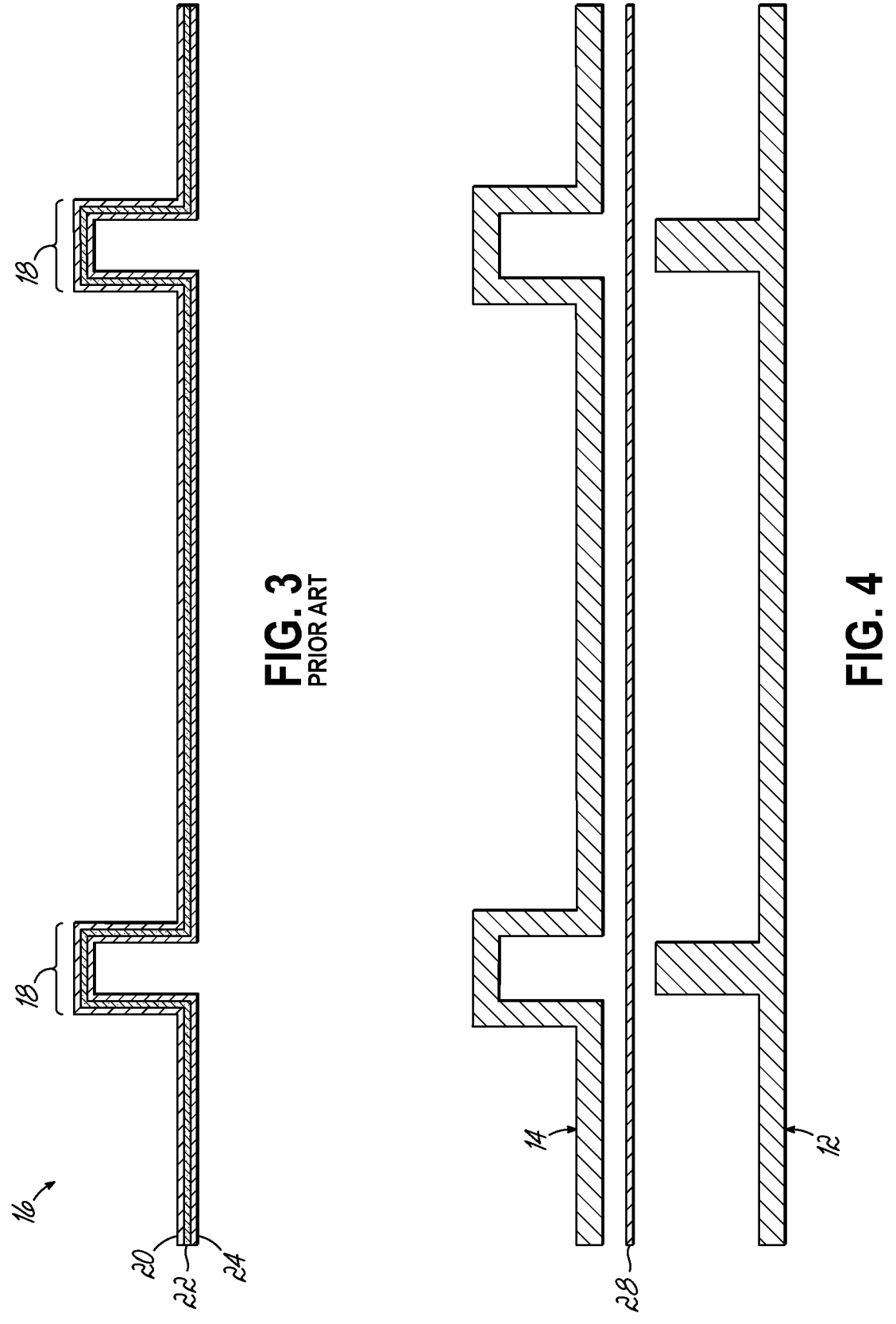
FIG. 3 is a schematic that shows a cross-sectional view of an embossed prior art label, wherein the multiple layers of the label (substrate, liner, and adhesive therebetween) are all embossed.
FIG. 4 is a schematic that shows a cross-sectional view of a male die and female die with a label substrate positioned between the two dies.
Figure 5:
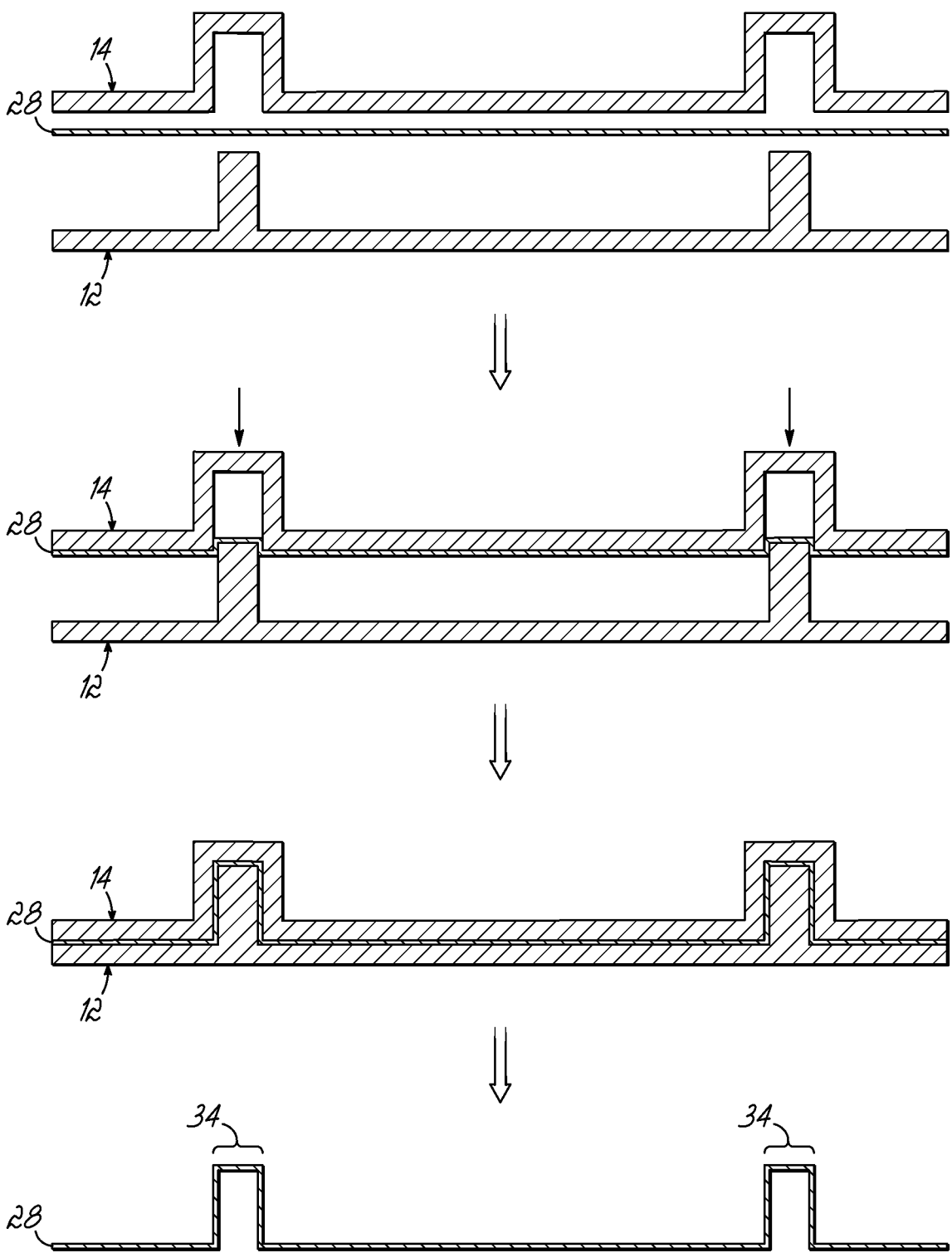
FIG. 5 is a schematic that shows the process of embossing a label substrate.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, current methods of creating relief images, text, graphics, etc. on labels are inadequate. Various aspects of the present invention overcome the drawbacks described above. They do so by providing a label wherein the height of the relief can be controlled (e.g., heightened over that of prior art labels). The various aspects of the present invention also provide embossed (or debossed) labels that do not suffer the problems with dispensing of labels during a high-speed application process. Further, the various aspects of the present invention provide embossed labels that can be used is applications that may be exposed to moisture or condensation without suffering the current problems with aesthetics when exposed to moisture/condensation.

In that regard, (and referring now to FIGS. 1 and 4-7), one aspect of the present invention is provided by a label 26 having a plurality of layers that includes at least (1) a label substrate 28, (2) an adhesive 30 adjacent the substrate, and (3) a liner 32 adjacent the adhesive 30, such that the adhesive 30 is disposed between the label substrate 28 and the liner 32. The label substrate 28 is embossed 34 or debossed, while the liner 32 is not embossed or debossed. In certain embodiments, then, only the label substrate 28 (i.e., the face stock of the label 26) is embossed 34. When embossing the label substrate 28 (e.g., a face stock), heat may be applied along with the application of pressure to thermoform the emboss on the label substrate 28. The thermoforming process includes heating a material to its forming temperature and applying force to the heated material to push it into cavities or over a mold—for example, over the mold of a male die and into a cavity of a female die—so the material conforms to the shape provided by the dies. The forces may be applied by various methods including mechanical assist (plugs), vacuum, and form air. In particular embodiments of the present application, the forces may be mechanically applied. Thermoforming of the emboss in or on the substrate can enhance setting of the emboss in or on the substrate, thereby preventing it from relaxing back to its natural state (or reducing relaxation over that which might be seen in the absence of thermoforming). The substrate may be any label substrate, including paper, films, and foils. Examples of various materials that can be used for the substrate may include any thermoformable film, including acrylonitrile butadiene styrene (ABS), polystyrene (such as high impact polystyrene-HIPS), polyethylene (including high density polyethylene-HDPE), polyvinyl chloride (PVC), polyethylene terephthalate (PET), and polyethylene terephthalate glycol (PETG). The embossed substrate 28 may then be laminated via adhesive 30 to a liner 32 (e.g., a pressure sensitive material in certain embodiments) and die cut, resulting in a label 26 in which the base of the label 26 is flat (because the liner 32 includes no embossing/debossing). This eliminates certain dispensing issues described in the Background with respect to current embossed/debossed labels.

In one embodiment, once the label substrate 28 is embossed 34, the embossed substrate may then be adhesive laminated to a liner 32 (e.g., a pressure sensitive material in certain embodiments) and die cut, resulting in a label 26 in which the liner 32 includes no embossing/debossing.

In an alternate embodiment of this aspect, a label 26 may have a plurality of layers that includes at least (1) a label substrate 28, (2) an adhesive 30 adjacent the substrate 28, and (3) a liner 32 adjacent the registered patterned adhesive 30, with the adhesive 30 being disposed between the label substrate 28 and the liner 32 in such manner that it is disposed between a non-embossed section of the label substrate 28 and the liner 32. In other words, the adhesive is patterned- and is patterned in a manner in register with sections of the substrate that are not embossed/do not receive an emboss. This may be referred to herein as a patterned registered adhesive. In this aspect or embodiment, only the substrate of the label construction (i.e., the top ply) is embossed 34. Once the emboss is formed, an adhesive 30 is then applied in register with the non-embossed section of the substrate 28. A liner 32 may be then applied to the side of the adhesive 30 layer opposite the substrate, forming the label 26. In this aspect or embodiment, the substrate could be any label substrate 28 including paper, film, and foils. Further, in this aspect or embodiment, one may thermoform the emboss 34 in or on the substrate.

Yet another aspect of the present invention is provided by a label having a plurality of layers that includes at least (1) a label substrate, (2) a laminating adhesive, and (3) a premanufactured label substrate. During preparation, the top ply (a substrate) is embossed 34, and then laminated to a pre-manufactured label substrate, resulting in a finished label construction with no embossing of the liner 32 (provided by the pre-manufactured label substrate). In other words, this embodiment of a label is very similar to that having substrate 28, adhesive 30, and liner 32—except in the present embodiment, the liner 32 is replaced with a pre-manufactured label substrate. Such a premanufactured label substrate may comprise a label stock, a pressure sensitive adhesive, and a liner. (In other words, the embossed label of this embodiment would appear as that shown in FIG. 7, except that the liner 32 of the label in that Figure would be replaced with three layers similar to substrate 28, adhesive 30, and liner 32, with none of those substrate, adhesive, and liner including an emboss.) The label stock of the premanufactured label substrate may be a thin label stock. The premanufactured label substrate may be a pressure sensitive label substrate. The top ply label substrate may be any label material, including paper, films, and foils.

In the above aspects and embodiments, once the label 26 construction is assembled, the labels 26 may be die cut to result in a finished label 26 or labels.

Figure 8:
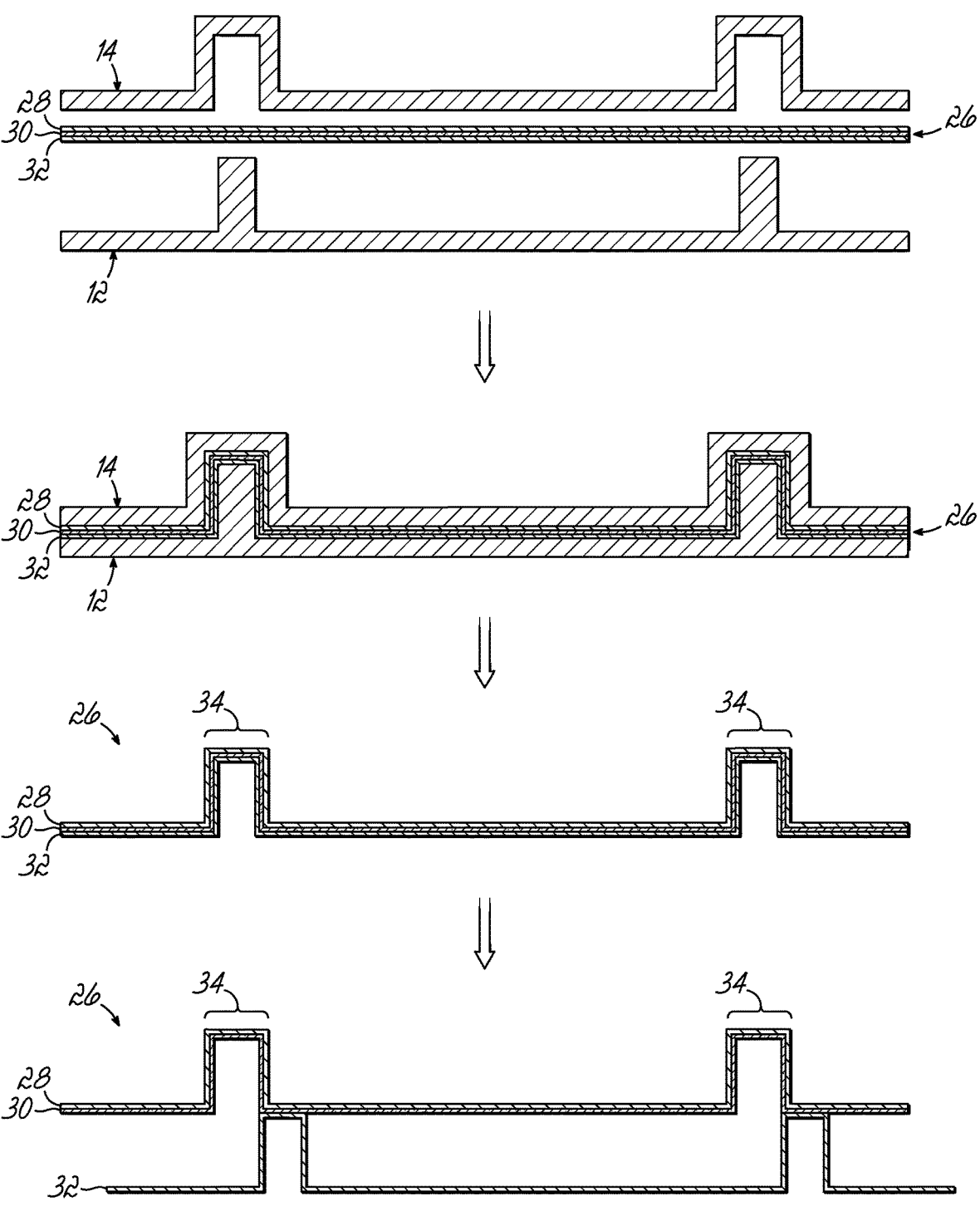
FIG. 8 is a schematic that shows the process of embossing a label and subsequently offsetting an embossed liner from an embossed substrate.

Referring now to FIG. 8, another aspect of the present invention may include a label 26 where the liner 32 is embossed 34 (at least initially). This aspect may include embodiments such as those described above, but where the entire label construction is subjected to the embossing/thermoforming process. As an example, then, such a label 26 may include at least (1) a label substrate 28, (2) an adhesive 30 adjacent the substrate, and (3) a liner 32 adjacent the adhesive 30, such that the adhesive 30 is disposed between the label substrate 28 and the liner 32. However, in this embodiment, the entire construction would be subjected to male and female dies 12, 14 to provide the emboss 34 through all of the layers.

In such an embodiment, to avoid dispensing issues (such as those described above in the Background), the embossed image of the liner 32 can be subsequently offset from the embossed image of the label substrate 28, once the embossing is complete. This may be accomplished with the use of a label shifter or a delamination/re-lamination process.

Figure 9:
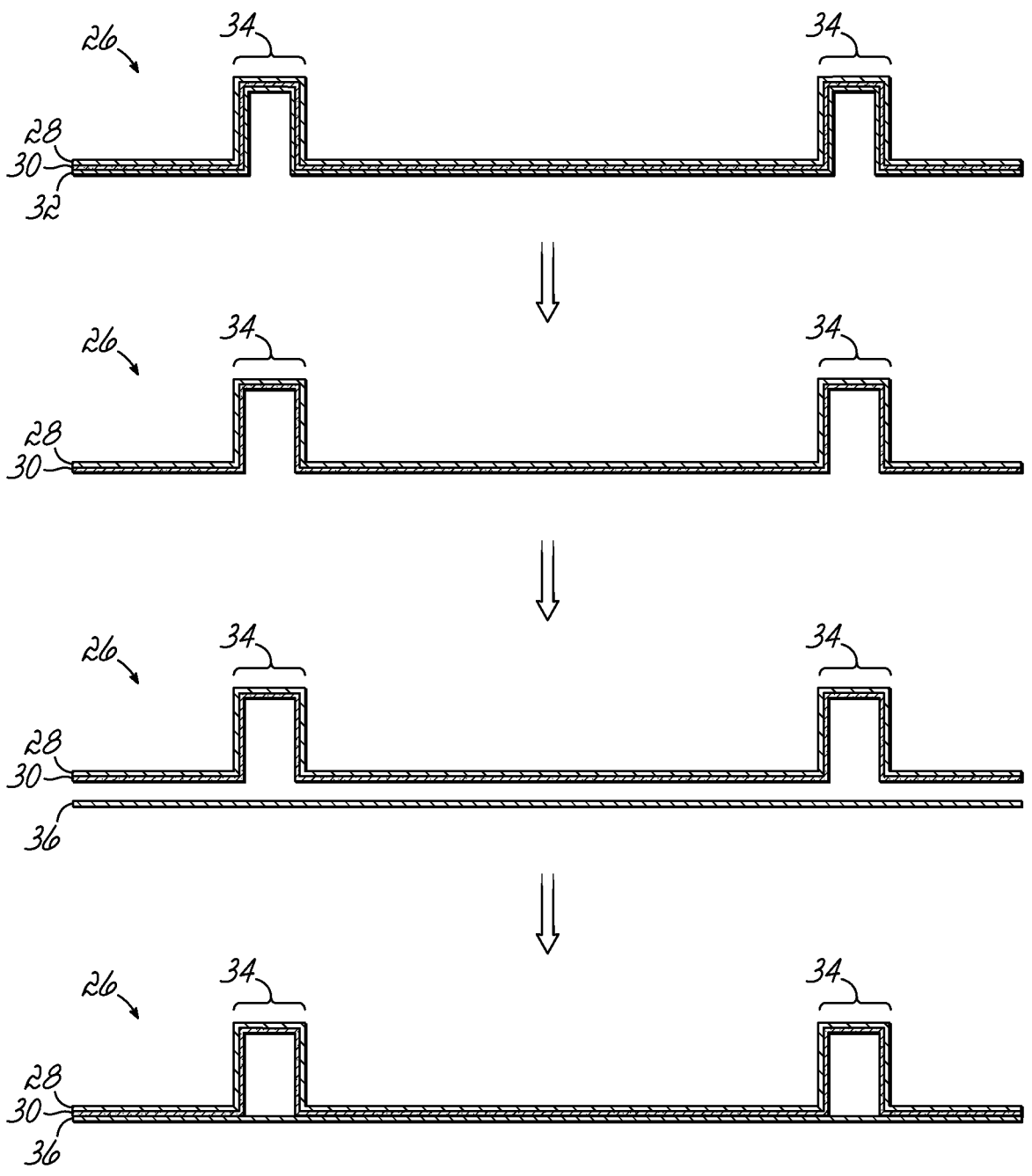
FIG. 9 is a schematic that shows the process of embossing a label and then replacing an embossed liner with a non-embossed liner.

Referring now to FIG. 9, another aspect of the present invention provides a label 26 that may include at least (1) a label substrate 28, (2) an adhesive 30 adjacent the substrate, and (3) a first liner 32 adjacent the adhesive 30, such that the adhesive 30 is disposed between the label substrate 28 and the first liner 32. Once this construction is formed, the entire construction (substrate 28, adhesive 30, and first liner 32) may be subjected to male and female dies 12, 14 (as described previously) to provide an emboss through all of these layers. Following embossing, the first liner 32 (which has the emboss) may then be removed and replaced with a second liner 36 that has not been embossed. This second construction (substrate 28, adhesive 30, and second liner 36) is the construction that would be used for application to an article to be labeled.

Another aspect of the present invention provides labels that are capable of being embossed or debossed, and can be used in heightened moisture and condensation environments without suffering the drawbacks of uncoated papers (while still providing a premium look). In that regard, the present inventor has determined that films that include styrene is useful in such an environment. Materials including styrene accept embossing and debossing very well. With this ability, texture background grains can be embossed/debossed onto a label substrate that includes styrene along with sculptured multi-level embossing (e.g., for text, graphics, and other label information). As a result, such a material including styrene can visually come very close to a traditional uncoated paper look and feel, but have the ultra-wet strength and moisture resistance of a film material. Matte UV varnishes, texture grains, and sculpted embossing elements, may be combined to provide high end premium looks.

And so, one exemplary embodiment of the present invention is a thermally embossed pressure sensitive film label 26. The label 26 may have a plurality of layers that includes at least (1) a label substrate 28, (2) an adhesive 30 adjacent the substrate 28, and (3) a liner 32 adjacent the adhesive 30, such that the adhesive 30 is disposed between the label substrate 28 and the liner 32. In this embodiment, the label substrate 28 is embossed 34 or debossed, while the liner 32 is not embossed or debossed. Thus, during assembly, a substrate for a label (e.g., a label facestock) may be passed between a male and female set of dies 12, 14 (exemplary dies 12, 14 are shown in FIG. 1). These dies may be rotary or flat bed. As the substrate is drawn through or between the male and female dies, the pattern or design of the dies produces the embossed (or debossed, as the case may be) pattern or design on the substrate. In the currently described embodiment for a thermally embossed label 26, heat may be applied during this process to cause or facilitate the emboss (or deboss) produced. In alternative embodiments, pressure may be used—or a combination of heat and pressure may be used. Schematics of the process of embossing a label substrate 28 may be seen in FIGS. 4 and 5.

Further, in this embodiment, the substrate may be a substrate for a pressure sensitive label (e.g., a pressure sensitive facestock). However, those of skill in the art will recognize that substrates for other types of labels may be subjected to the same or similar process for embossing (or debossing).

Figure 6:
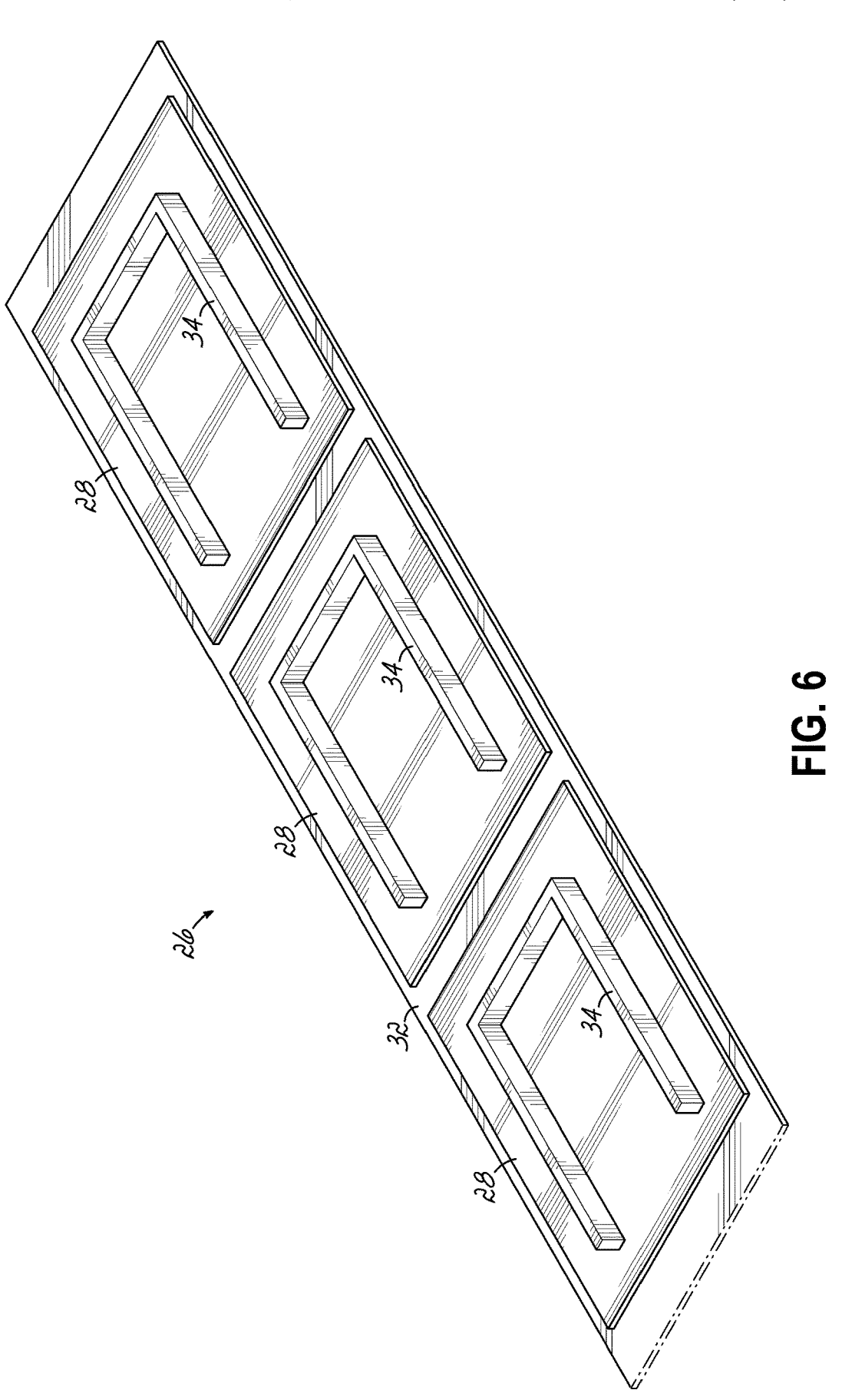
FIG. 6 is a schematic that shows completed label portions on a release liner.
Figure 7:
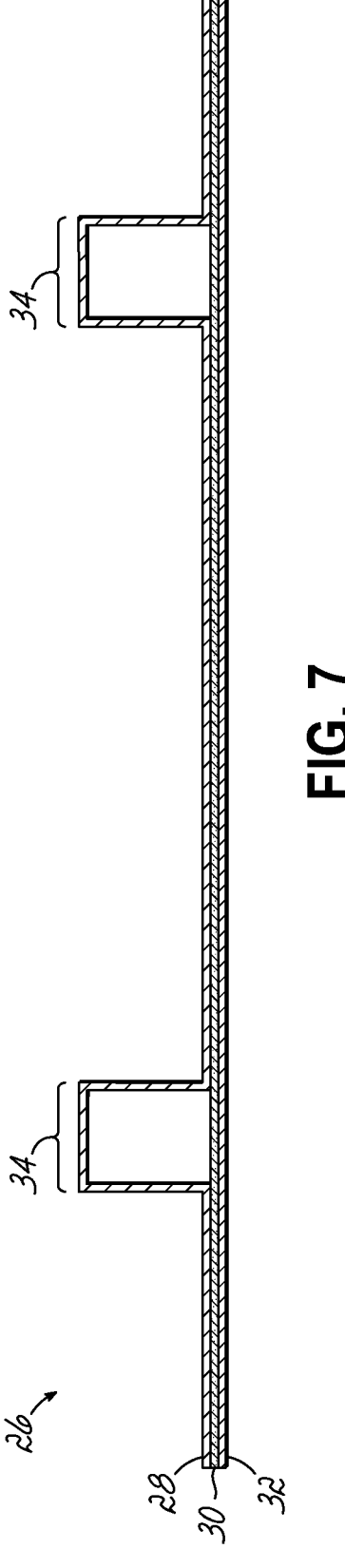
FIG. 7 is a schematic that shows a cross-sectional view of an embossed label in accordance with principles and aspects of the present invention, including an embossed substrate and non-embossed liner.

Once the substrate has been embossed 34, an adhesive 30 and a liner 32 may be applied to the substrate to complete the label construction on the liner (see FIG. 6 for a representative of a completed label construction on liner). This results in a label 26 construction including (1) a label substrate 28, (2) an adhesive 30 adjacent the substrate, and (3) a liner 32 adjacent the adhesive 30, such that the adhesive 30 is disposed between the label substrate 28 and the liner 32. The embossed images, pattern, design, text, graphics, etc. will be present on the substrate. As will be appreciated by those of ordinary skill in the art, in this embodiment (as seen in FIG. 7), only the substrate will have received the emboss, while the adhesive 30 and carrier sheet will not have been subjected to the embossing process, and so will not include embossed images, pattern, design, text, graphics, etc. This allows for greater height and definition of the emboss. This also allows for an embossed (or debossed) label that can be subjected to high speed applications because the even surface of the liner eliminates the dispensing issues described above with respect to embossed labels having a liner that caries the emboss. This reduces or eliminates the misapplication of labels, the failure of labels to apply once dispensed, or the failure of those labels to dispense from the apparatus (with the attendant need to remove and reapply misapplied labels, and any downtime that may result from labels that do not dispense from the apparatus).

Further in this embodiment (or in alternate embodiments), options for such a label 26 may include a label substrate 28 being a premanufactured pressure sensitive label stock including styrene. Such label stock may be of single ply polystyrene or laminated polystyrene. And so, in one embodiment, the label 26 may have multiple layers that include at least (1) a label substrate 28 of single ply polystyrene or laminated polystyrene, (2) an adhesive 30 adjacent the substrate, wherein the adhesive 30 is a pressure sensitive adhesive, and (3) a liner 32 adjacent the adhesive 30, such that the adhesive 30 is disposed between the label substrate 28 and the liner 32. In this embodiment, the label substrate 28 (of single ply polystyrene or laminated polystyrene) is embossed 34 or debossed, while the liner 32 is not embossed or debossed.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. A label comprising:
a label substrate;
an adhesive adjacent said substrate; and
a liner adjacent said adhesive;
wherein said adhesive is disposed between said label substrate and said liner, and is the only material disposed between said substrate and said liner;
wherein said label substrate is embossed to form an embossed section, and said liner is not embossed
wherein an interior space is present between said embossed section and said liner; and
wherein the adhesive is patterned in a manner such that the adhesive is disposed only between a non-embossed or non-debossed section of the label substrate and the liner.

2. The label of claim 1, wherein said label substrate is the only layer of said label that is embossed or debossed.

3. The label of claim 1, wherein the label substrate includes styrene.

4. The label of claim 1, wherein the label substrate is chosen from a single ply polystyrene and a laminated polystyrene.

5. The label of claim 1, wherein the label substrate is chosen from a single ply of a thermoformable filmic substrate.

6. A label comprising:
a plurality of layers, wherein said plurality of layers includes at least
(1) a label substrate, wherein said label substrate is embossed to form an embossed section,
(2) a laminating adhesive, and
(3) a pressure sensitive label substrate;
wherein the pressure sensitive label substrate comprises a label stock, a pressure sensitive adhesive, and a liner; and
wherein said pressure sensitive adhesive is disposed between said label stock and said liner, and is the only material disposed between said label stock and said liner; and
wherein the adhesive is patterned in a manner such that the adhesive is disposed only between a non-embossed section of the label substrate and the pressure sensitive label substrate.

7. The label of claim 6, wherein said label substrate is the only layer of said label that is embossed.

8. The label of claim 6, wherein the label substrate includes styrene.

9. The label of claim 6, wherein the label substrate is chosen from a single ply polystyrene and a laminated polystyrene.

10. The label of claim 6, wherein the label substrate is chosen from a single ply of a thermoformable filmic substrate.

* * * * *